Sept. 5, 1944.　　　T. H. JOHNSON　　　2,357,331
PHOTOGRAPHIC SHUTTER
Filed Oct. 24, 1942　　　3 Sheets-Sheet 1

INVENTOR
THOMAS H. JOHNSON

Sept. 5, 1944.   T. H. JOHNSON   2,357,331
PHOTOGRAPHIC SHUTTER
Filed Oct. 24, 1942   3 Sheets-Sheet 2

INVENTOR
THOMAS H. JOHNSON

Sept. 5, 1944.  T. H. JOHNSON  2,357,331
PHOTOGRAPHIC SHUTTER
Filed Oct. 24, 1942  3 Sheets-Sheet 3
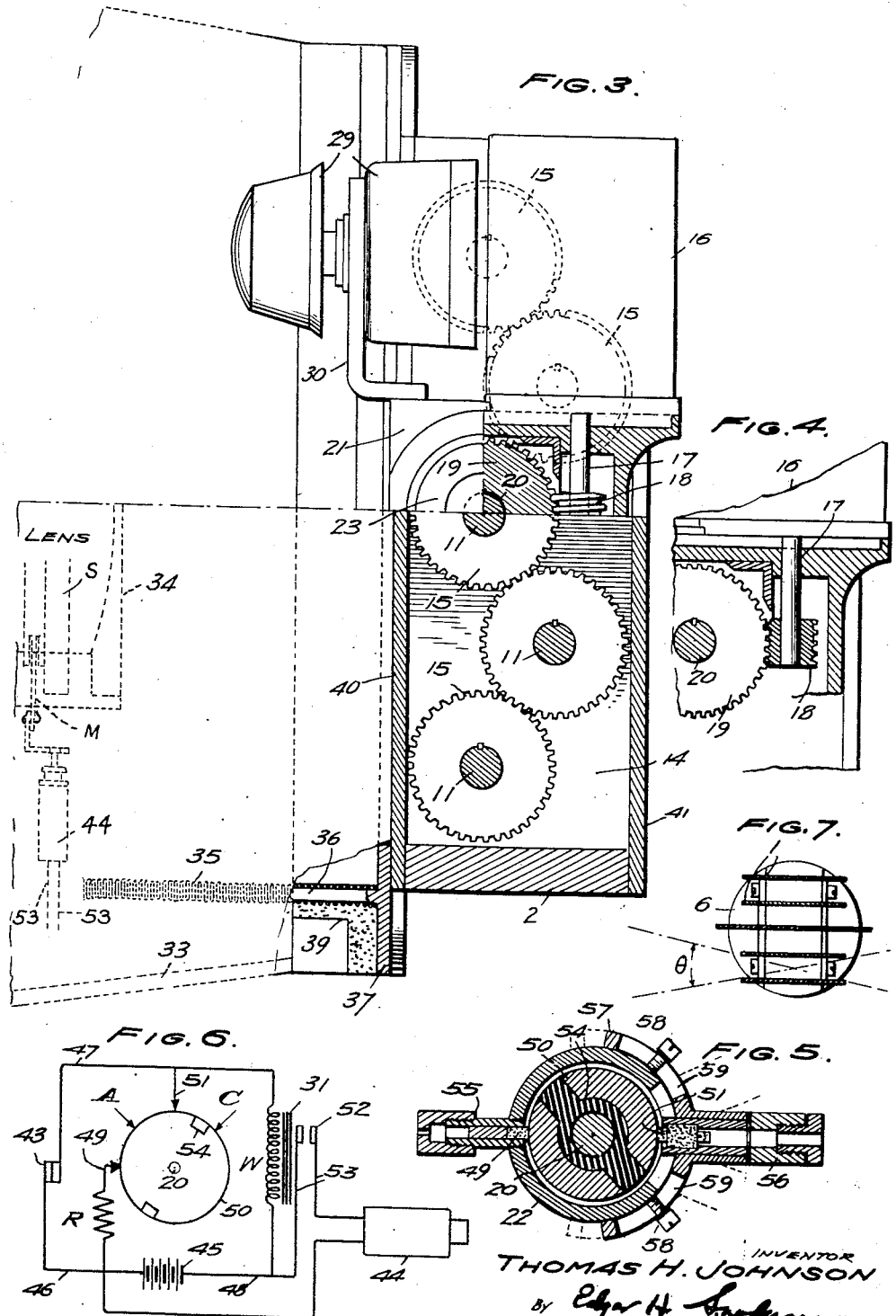
INVENTOR
THOMAS H. JOHNSON
ATTORNEYS Patented Sept. 5, 1944

2,357,331

UNITED STATES PATENT OFFICE 2,357,331

PHOTOGRAPHIC SHUTTER

Thomas H. Johnson, Swarthmore, Pa.

Application October 24, 1942, Serial No. 463,196

8 Claims. (Cl. 95—53)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to improvements in high speed camera-shutters and the chief object of the invention is to provide a novel high speed shutter of the so-called "Louvre" type which may be attached either in front of or behind the lens of a camera with a between-the-lens shutter of the usual type to give shorter times of exposures than are possible with the latter type of shutter alone.

A high speed shutter has the advantages that rapidly moving objects can be photographed without loss of definition from rapidly moving vehicles, such as aircraft, or under conditions where the camera or its mount are subjected to vibration, and that brightly illuminated objects can be photographed with the full available aperture of the camera without introducing reducing filters.

An essential feature of the subject shutter which enables it to achieve the above result is that the louvres or shutter vanes, which define the exposure time, are in continuous and rapid motion and are not required to be either accelerated or decelerated during the time of the exposure. Since this continuous motion of the louvres results in a series of exposures, a synchronizing device is provided which allows only one of the series of louvre shutter exposures to coincide with the opening of the between-the-lens shutter.

Other objects and advantages of the invention will be apparent from the following detailed description thereof.

Referring to the accompanying drawings in which is illustrated one embodiment of the invention especially designed to be attached in front of the lens of a conventional aerial camera with electrically triggered between-the-lens shutter:

Figure 3 is an enlarged horizontal sectional view on line 3—3 of Figure 2 also showing the position of the shutter with reference to the camera;

Figure 4 is a section on line 4—4 of Figure 2;

Figure 5 is a section on line 5—5 of Figure 2 showing the arrangement of brushes and rotor of the circuit-interrupter for synchronizing the triggering current for the main between-the-lens shutter of the camera with the phase of rotation of the louvres;

Figure 6 is a circuit diagram showing the connections of the synchronizing circuit, and Figure 7 is a section of one of the sets of rotating louvres showing the angular range of the position of the louvres for which rays parallel to the optical axis of the camera pass through the shutter.

Figure 1:
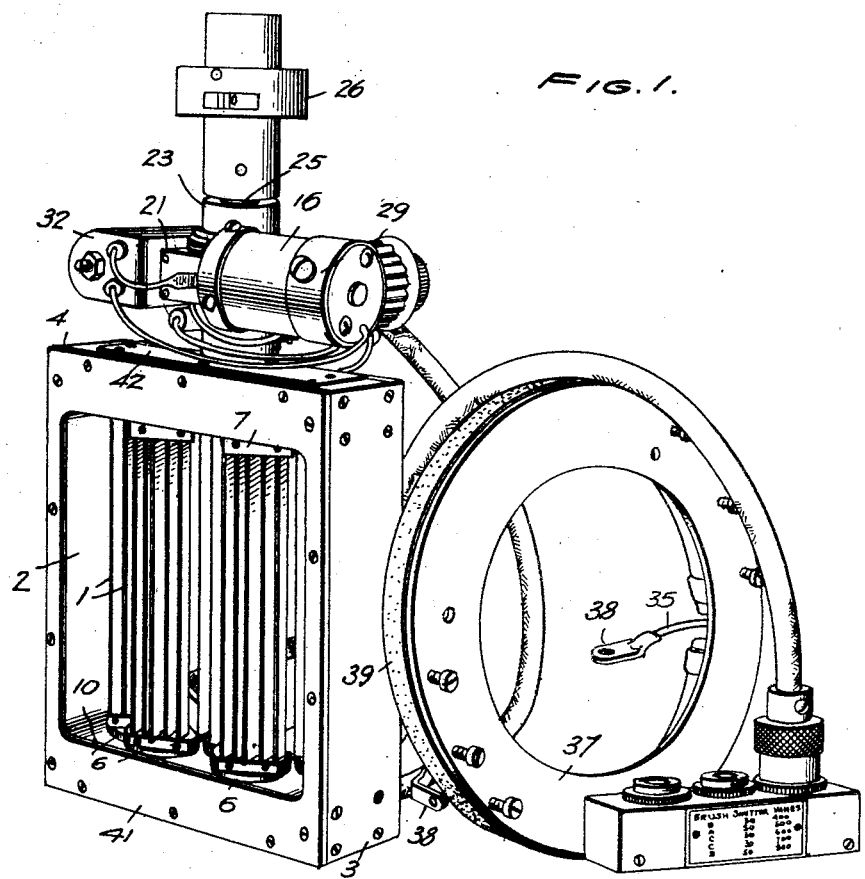
Figure 1 is a perspective view of the shutter with the shutter mounting elements shown detached from the shutter frame.

In the form herein disclosed the shutter comprises five vertical sets of louvres or shutter vanes 1 mounted for rotation in a rectangular frame composed of vertical side members 2 and 3 and horizontal top and bottom members 4 and 5. Each set consists of five laterally spaced and parallel vanes or louvres whose ends are secured in disks 6 and 7. Disk 6 secures the lower ends of the louvres and is supported within the frame by a depending stub shaft 8 journaled in a ball bearing 9; the latter being mounted in the bottom bearing-support member 10 of the frame. Disk 7 secures the upper ends of the louvres and has an upwardly extending stub shaft 11 journaled in ball bearings 12 and 13, the former being mounted in the top frame member 4 and the latter in the top bearing-support member 14 of the frame. Shaft 11 is longer than shaft 7 and has a gear 15 connected thereto within the clearance provided between the frame members 4 and 14. The gears 15 of the various sets mesh with one another and in order that the louvres 1 shall be free to rotate without interference between the sets, the gears 15 and their corresponding sets of louvres are mounted with their axes along two separate lines as shown in Figure 3.

Figure 2:
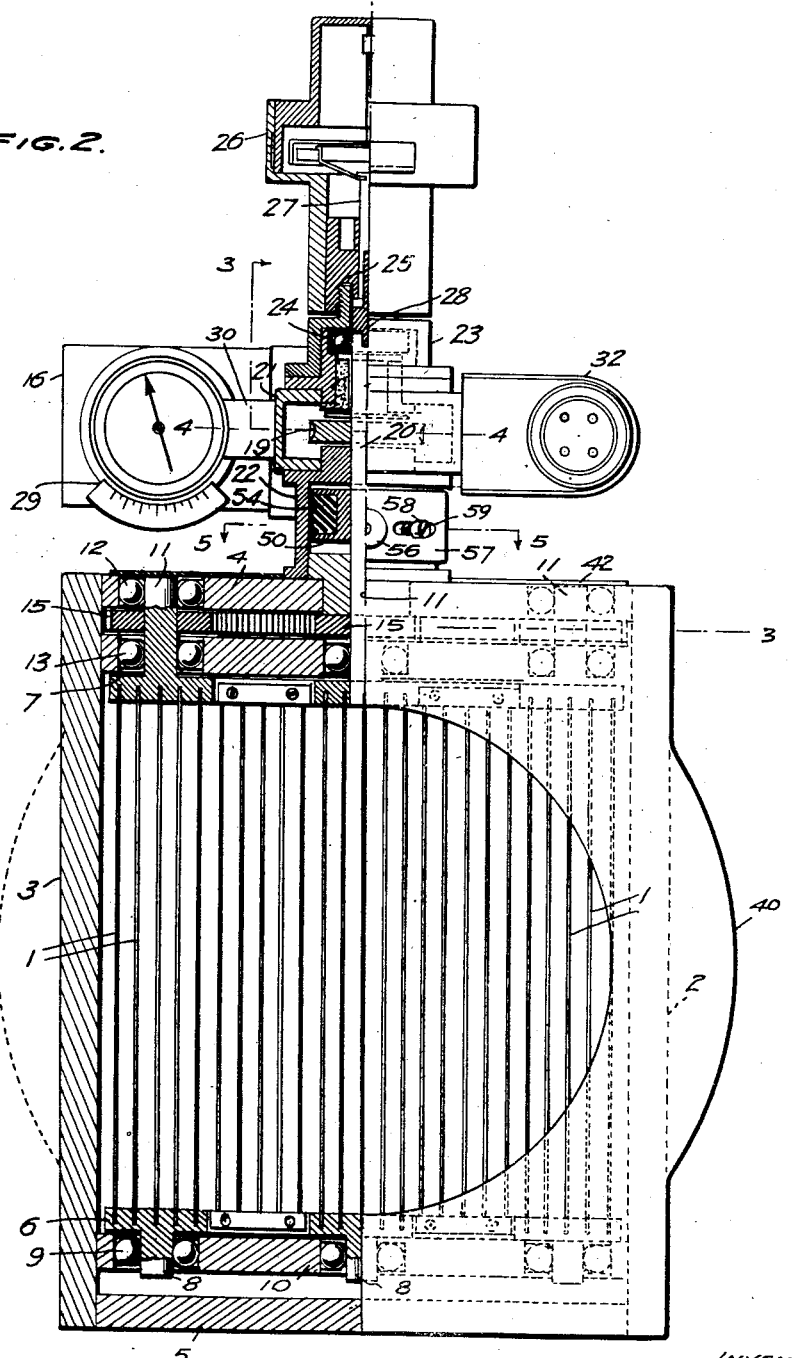
Figure 2 is a view, partly in elevation and partly in section, of the shutter from the back or camera side thereof.

The several sets of louvres are simultaneously rotated by a shutter-driving mechanism including a motor 16 having a driving shaft 17 provided with a worm 18. Worm 18 meshes with a worm gear 19 fixed on shaft 20, the latter being an integral extension of the shaft 11 of the middle set of louvres and projecting upwardly beyond the top of the frame as shown in Figure 2. Gear 19 is housed within a gear box 21 which is supported in fixed, outwardly spaced, relation to the top of the shutter frame upon the top flange of the circuit-interrupter housing 22; the bottom flange of the housing resting upon and being fixed to the top member 4 of the frame. Upon the top face of the gear box 21 is fixedly mounted an inverted cup-shaped fitting 23 into which the end of shaft 20 extends and wherein the radial loads are taken by an annular ball bearing 24. Connected to the fitting 23 by a screw-threaded joint 25 is the casing of a magnetic tachometer 26. The shaft 27 of the tachometer is driven by the shaft 20 of the shutter driving mechanism to which it is coupled by a clutch connection 28. The magnetic tachometer may be any suitable and well known type and its specific construction forms no part of the present invention. The angular velocity of the sets of louvres is dependent upon the speed of rotation of the electric motor and this is controlled by a rheostat 29 and indicated by the tachometer 26. The rheostat and the motor are disposed adjacent a common side of the gear box 21; the former being connected to the gear box by a supporting bracket 30 and the latter merging into the box construction as shown in Figure 3. To counter balance the weight of the motor and rheostat, other elements of the shutter mechanism, including the relay 31 (Figure 6), of the synchronizing circuit, are housed within a casing 32 at the opposite side of the gear box 21.

The time of the exposure is a function of the angular velocity of the sets of louvres and the angle $\theta$ (Figure 7) which determines the range of positions of the louvres at which light passes through to the lens of the camera in a direction parallel to the optical axis. As is apparent from the construction shown in Figures 1 and 7, the parallel vanes or louvres of each set are rigidly mounted together and capable of rotation as a unit so that the range of angles, in a complete rotation of the unit, for which rays of light are allowed to pass through the shutter is small compared with the complete rotation. The central louvre of each set is broader than the others and when the louvres are perpendicular to the optical axis these broader louvres overlap so that no light is allowed to pass between the successive sets. The spacing between the louvres of each set is such that the diffraction pattern from each slit determined by two adjacent louvres is not so broad as to effect the definition of the lens. This consideration is determined by well-known principles of physical optics. The louvres 1 are specially treated with a blackening coat to prevent specular reflection from their surfaces which would cause bright objects to cast a streak of light across the camera film perpendicular to the axis of rotation of the louvres.

The position of the louvre shutter with reference to the aerial camera is graphically shown in Figure 3. The cone 33 of the camera and one of the lens elements 34 thereof are represented by dotted line construction. In order to avoid transmitting vibrations from the louvres to the camera, the shutter is attached to the camera by springs 35. Each spring is secured at one end to an anchoring bolt or stud 36 fixed to the shutter-mounting plate 37 and at its opposite end to a bracket 38 (Figure 1) attached to a suitable part of the camera structure. The mounting plate bridges the cone of the camera. Between the mounting plate and the cone is a layer 39 of sponge rubber. The shutter is mounted on the plate 37 by means of the cover plate 40 attached to the rear of the shutter frame. The rear cover plate also serves to exclude dirt and other foreign matter from mechanical parts of the shutter and a similar function is performed by the front cover plate 41. A thin cover plate 42 is fastened to the top frame member 4 for excluding foreign matter from the bearings 12 and 13.

The representation of the camera in Figure 3 includes a conventional showing of only a part of an electrically triggered between-the-lens shutter mechanism in which the shutter leaves in part S are operated by a triggering solenoid 44 coacting with the shutter-actuating member M. The construction and operation of this type of shutter is well known in the art and forms no part of the subject invention except insofar as combined and synchronized with the louvre shutter to allow only one of each series of louver shutter exposures to coincide with the opening of the between-the-lens shutter. However, the solenoid 44 and other elements of the shutter operating circuit pertinent to the subject invention, such as the switch 43 and the relay 31, are shown in the circuit diagram of Figure 6. The switch 43 controls the operation of the relay 31 through a main circuit which includes the battery 45, switch 43, relay winding W, and conductors 46, 47 and 48. The relay is subject to control also through a parallel branch of the main circuit which includes the resistance R in series with a circuit-interrupter which includes a stationary brush 49, rotor 50, and adjustable brush 51. The relay 31 operates the switch 52 of a secondary circuit through which current is conducted to the triggering solenoid 44. This circuit includes the battery 45, triggering solenoid 44 which operates the shutter-actuating member M of the between-the-lens shutter of the camera, switch 52 and conductors 53 connected to the battery leads 46 and 48. One of the contact elements of the switch 52 is carried by the relay armature which is tensioned to close the switch when not attracted to the relay core.

As shown in Figure 2, the rotor is fixed on the shutter drive shaft 20 and is encased within the housing 22. As shown more particularly in Figure 5, the brushes 49 and 51 extend into the housing 22 through openings in the side wall thereof and contact the rotor radially of the peripheral face of the latter. Embedded in the rotor is an insulated segment 54 having exposed end portions flush with the peripheral face of the rotor at diametrically opposite locations. These end portions are adapted to be contacted by the brush 51 during the rotation of the rotor 50 for periodically breaking the parallel circuit and interrupting the flow of current to the relay 31. As shown in Figure 2 of the drawings, the rotor 50 has conducting flanges extending on each side of the insulating insert 54 to the circumference of the rotor. The brush 49 is offset with respect to the rotor 50 and brush 51 in such way that it contacts one of these flanges to make continuous contact with the conducting part of the rotor. Brush 49 is carried by a holder 55 having a direct and fixed connection with the interrupter housing 22. Brush 51 is carried by a holder 56 fixedly mounted on an arcuate slide 57. Slide 57 is disposed against the side of the housing 22 and is retained thereagainst by keeper elements 58 secured to the housing and extending through circumferentially elongated slots 59 in the slide. Within the limits of the elongated slots, the slide may be moved around the housing to place the brush 51 in any position between A and C (Figure 6) as required either to advance or retard the breaking of the parallel circuit. This adjustable brush assembly thus provides a sensitive control whereby the operation of the relay 31, and hence the triggering current for the main between-the-lens shutter of the camera, is synchronized with the phase of rotation of the louvres so that, during the time interval the main circuit is open at the switch 43, only one of the series of louvre shutter exposures is allowed to coincide with the opening of the between-the-lens shutter.

During the period of operation of the camera, the motor 16 is in continuous rotation so that the louvres 1 are periodically obstructing and allowing the passage of light rays from the object to the camera lens. The time of the opening of the louvres is indicated by the magnetic tachometer 26 and may be regulated by the rheostat 29. No exposure of the film occurs, however, until and unless the between-the-lens shutter of the camera is opened by operation of the shutter-tripping solenoid 44 in synchronization with the phase of rotation of the louvres. Normally, the switch 43 of the main relay-control circuit is closed and the relay 31 is thereby operated to open the switch 52 of the secondary circuit. Hence, the shutter-tripping solenoid remains inactive so long as the switch 43 is closed. When an exposure of the film is desired, the switch 43 is opened to release the relay from the control of the main circuit and to subject it entirely to the control of the current in the parallel circuit passing through the rotor 50 and the brushes 49 and 51. This transfer of control of the relay from the main circuit to the parallel circuit is accomplished without immediately effecting the operation of the relay. However, when the parallel circuit is broken by the rotation of the rotor 50 to a position where the brush 51 is engaged with the insulated segment 54 the relay is deenergized and the switch 52 automatically closes the secondary circuit through which the shutter-tripping solenoid 44 is operated.

Although the contact made by brush 51 with the rotor 50 is broken by segment 54 for a very short period of time, the break is, in general, sufficient to allow the relay to release the armature. Operation of the relay to reset the shutter-tripping solenoid, after each shutter tripping action of the latter, is accomplished through the main relay control circuit by closing switch 43 since the resistance R, Figure 6, is of such a value that the current through the parallel circuit is insufficient to reenergize the relay. Hence, the switch relay-operated switch 52 remains closed after the initial break in the parallel circuit, for a period of time, controlled by the switch 43, of sufficient duration to allow the current in the secondary circuit to build up and cause the triggering solenoid to operate the between-the-lens shutter. The combination and synchronization of the high speed louvre shutter and the between-the-lens shutter results in a shorter time of exposure of the camera film than is obtainable with the between-the-lens shutter alone.

It is understood that the invention is not limited to the construction herein specifically illustrated and described but can be embodied in other forms, within the scope of the appended claims, without departure from the general principle thereof.

I claim:

1. A photographic shutter comprising a frame, multiple sets of laterally spaced parallel louvres mounted in the frame, each set being rotatable about an individual axis and the louvres of each set being rigidly mounted together for rotation as a unit about the axis of the set, and means for rotating the said sets simultaneously about their respective axes.

2. A photographic shutter comprising a frame, staggered sets of laterally spaced parallel louvres rotatably mounted in the frame, each set being rotatable about an individual axis and the louvres of each set being rigidly mounted together for rotation as a unit about the axis of the set, and means for rotating the said sets simultaneously about their respective axes.

3. A photographic shutter comprising multiple sets of parallel and laterally spaced louvres, said sets being connected together for simultaneous rotation about their respective axes and the louvres of each set being rigidly mounted together and capable of rotation as a unit so that in a complete rotation of the unit the range of angles for which rays of light are permitted to pass through the shutter is small compared with the complete rotation.

4. A photographic shutter comprising a frame, staggered sets of laterally spaced parallel louvres rotatably mounted in the frame and having synchronous exposure periods, each set being rotatable about an individual axis and the louvres of each set being rigidly mounted together for rotation as a unit about the axis of the set, the central louvre of each set being broader than the others of the set so that when the position of the louvres is perpendicular to the optical axis the central louvres overlap and prevent the passage of light between adjacent sets.

5. A shutter for attachment to a camera including a frame, louvres rotatably mounted in the frame and connected together to be moved simultaneously to open and close the aperture of the frame, a mounting plate on the back of the said frame and adapted to bridge the cone of the camera, elastic elements secured to the said plate and extendable into the said cone for attachment to a structural part of the camera for holding the plate against the cone of the camera.

6. A shutter for attachment to a camera including a frame, louvres journaled in the frame and connected together to be rotated simultaneously to open and close the aperture of the frame, a mounting member on the back of the frame and adapted to bridge the cone of the camera, tension elements secured to the mounting member and attachable to a structural part of the camera for holding the member under tension against the said cone of the camera, and an elastic body secured to the member to engage the cone and provide a resilient pad between the cone and the mounting member in the attached position of the shutter.

7. In a camera, the combination of a main shutter of between-lens type, an additional shutter of rotatable louvres optically aligned with the main shutter, operating mechanism associated with the additional shutter and operable for rapidly rotating the louvres simultaneously to open and close said shutter at a given frequency for a definite time period, operating mechanism associated with the main shutter and operable for opening the said shutter at less frequency than the louvre shutter during the said given time period, and a shutter synchronizing mechanism interconnecting the respective shutter-operating mechanisms and operated thereby for causing the coincidences of the shutter openings to occur along the optic axis of the camera.

8. In a camera, the combination of a between-the-lens shutter having a shutter-actuating member, a rotatable louvre shutter, means for rotating the louvre shutter, an electrical means for synchronizing the operation of the two shutters comprising a triggering solenoid connected to the shutter-actuating member, a relay for controlling the current to the solenoid, a rotor driven by the louvre-shutter rotating means and electrically connected to one side of the relay, an insulating segment on said rotor, an adjustable brush electrically connected to the other side of the relay and engaged with the rotor to be contacted at intervals by the insulating segment to open the circuit through the relay, said brush being adjustable on the rotor to vary the timed relation between the louvre shutter and the between-the-lens shutter.

THOMAS H. JOHNSON.